(12) United States Patent
Yokoyama et al.

(10) Patent No.: US 6,272,279 B1
(45) Date of Patent: Aug. 7, 2001

(54) EDITING METHOD OF MOVING IMAGES, EDITING APPARATUS AND STORAGE MEDIUM STORING ITS EDITING METHOD PROGRAM

(75) Inventors: Toshiaki Yokoyama, Kodaira; Hirotada Ueda, Kokubunji, both of (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/038,287

(22) Filed: Mar. 11, 1998

(30) Foreign Application Priority Data

Mar. 14, 1997 (JP) .................................................. 9-061401

(51) Int. Cl.⁷ .................................................. H04N 5/76
(52) U.S. Cl. .................................................. 386/52
(58) Field of Search .................................... 386/46, 52, 55, 386/65, 68, 64; 345/328; 352/129

(56) References Cited

U.S. PATENT DOCUMENTS

| | | | | |
|---|---|---|---|---|
| 5,204,706 | * | 4/1993 | Saito | 352/129 |
| 5,930,446 | * | 7/1999 | Kanda | 386/52 |

* cited by examiner

*Primary Examiner*—Huy Nguyen
(74) *Attorney, Agent, or Firm*—Antonelli, Terry, Stout & Kraus, LLP

(57) ABSTRACT

A computer-aided editing method of moving image information comprises designating an edition range of original moving image information, applying a special effect processing to the moving image within the designated edition range by an editing apparatus, registering the moving image information applied with the special effect processing as one cut to a memory device, and registering the moving image information outside the designated range as other cuts to the memory device. A computer-aided editing apparatus of moving image information comprises a memory device for storing original moving image, moving images after editing processing and an edition position-associated information, an input device, an editing device for applying a special effect processing to a designated range of the original moving image read out from the memory device in accordance with an image processing program, a control device and a display device. The moving image information applied with the special effect processing is registered as one cut to the memory device and the moving image information of the original moving image outside the designated range is registered as other cuts to the memory device. The display device displays the original moving image information, symbols representing an edition start point and an edition end point inputted by the input device, the information on the special effect processing and the information on the length of the image of the cut.

14 Claims, 13 Drawing Sheets

| FIG.11A |
| FIG.11B |

EDITING METHOD OF MOVING IMAGES, EDITING APPARATUS AND STORAGE MEDIUM STORING ITS EDITING METHOD PROGRAM

BACKGROUND OF THE INVENTION

This invention relates to a moving image editing apparatus used for producing programs such as television broadcasting programs and video programs and more particularly, to an editing method of a moving image editing apparatus which is (are) suitable for editing image information to which special effect processing of moving image information is applied.

Higher functions have been achieved rapidly in recent years in production equipment for producing television broadcasting programs and video programs by using computers.

To produce a program, it has been a customary practice to employ an image editing method which uses a video tape recorder and repeats fast-forward and rewinding operations of a tape by referring to a tape address counter so as to edit image information. To replace this method, an image editing method using a moving image editing apparatus for editing image information by reading out digital image information stored once in a random access storage device, which is easy to use, can easily store data and is economical, such as a hard disk and an optical disk, has been used in most cases.

When editing is made by using such an editing apparatus, it is one of the indispensable editing works for producing a program to apply a special effect processing to a certain portion or portions in the moving images in order to enrich the representation effects of the image.

The term "special effect" used hereby includes a freeze effect which continuously outputs the image of one frame in the moving image in such a manner as to freeze them for a certain period, and a motion effect represented by a variable effect which reproduces more slowly (slow) or more quickly (fast) a certain portion of the moving images than a normal reproduction speed at which images of 30 frames per second are reproduced. The special effect includes further a superimpose effect which is produced by combining a telop with the moving images of a certain portion and effects which connect cuts and scenes of moving images by using connecting methods such as "wipe", "dissolve", "fade", etc, between the cuts as moving image information corresponding to a series of image contents or between the scenes comprising a plurality of cuts.

Hereinafter, the explanation will be given on the procedures of a processing method when a variable effect processing is applied to moving images in a heretofore known editing apparatus.

The term "variable effect processing" means a processing applied to the moving images which are reproduced at a reproduction speed different from a standard reproduction speed. It will be assumed hereby that the standard reproduction speed is 30 frames per second, for example. When the moving images recorded at 30 frames/sec are reproduced twice an each frame continuously, this reproduction becomes a slow reproduction at a 50% speed. And a high speed reproduction at a 200% speed can be achieved by outputting the moving images recorded at a 30 frame/sec while the odd-numbered or even-numbered frames are being skipped.

FIGS. 2 and 3 depict an original moving image 1101 by the framework image of the picture film. Square frames with reference numerals 0 to 9 represent respectively the frames of the moving image. Reproduction is effected from the frame 0 (frame with frame No. 0) to the frame 9 (frame with frame No. 9).

The explanation will be given hereby on the editing work for obtaining 50% slow reproduction images from a part of this moving image 1101.

It will be assumed that a variable effect for setting the reproduction speed to 50% of the normal speed is applied to three frame image portions from the time code (time code corresponding to the frame number) "3" to the time code "5" of the original image material 1101. As a result, a new image material 1103, that is, the image information in which each of the three frame images described above continues twice, is registered as a new cut to an image editing apparatus, as shown in FIG. 2. A new contracted image information corresponding to the image material 1103 registered in this manner is stored in a memory and its contracted image is displayed on a screen.

FIG. 5 shows an example of an operation screen display in a monitor of the image editing apparatus. On the screen are displayed a material window 201 for tabulating and displaying a contracted moving image corresponding to each image material (image information for each cut) registered to the image editing apparatus, a pop-up monitor window 202 for selecting and designating the image displaying and the special effect processing and a time line window 203 for aligning a plurality of image materials in association with one another in a predetermined sequence.

Here, the contracted images 301 as the representative images of the image materials registered at the start of editing process are displayed in the material window 201. A text of the name, title, etc, of each image material is displayed below and near the display position of the contracted images 301.

The contracted image or images corresponding to those image materials which are desired to be used for the program are selected from the material window 201 by an external input device such as a mouse, a keyboard, and so forth. The pop-up monitor window 202 such as the one shown in FIG. 6 is displayed on the monitor and the image of the selected image material is displayed in a moving monitor area 407 of the pop-up monitor window 202.

An IN-point button 403 and an OUT-point button 404 are selected and designated so as to select the image range, to which the special effect processing is applied, from among the image materials. When the IN-point button 403 is selected and designated, an instruction is given so as to position as IN-point mark 402 to a position corresponding to the start point of the image range on a position control bar 401. Next, when an OUT-point button 404 is selected and designated, an instruction is given so as to position an OUT-point mark 405 to a position corresponding to the end point of the image range on the position control bar 401.

When the kind of the special effect applied to the selected range described above is the variable effect (motion effect), a motion effect button 406 on the pop-up monitor window 202 is selected and designated, so that a motion effect setting panel shown in FIG. 7 is displayed. In this motion effect setting panel, the reproduction speed is set at a ratio of the reproduction speed after setting to the normal reproduction speed by the mouse or the keyboard operating by using a reproduction speed set dialog box 601. In the example shown in FIG. 7, the ratio is set and inputted to 75.00%. A duration length (the length associated with the number of frames and the time length) is also set by using a duration length set dialog box 602. In the example shown in FIG. 7, the length is set and inputted to 351 frames. Alternatively, a frame ratio corresponding to the number of frames appearing per unit time is set by using a frame ratio set dialog box 603. In the example shown in FIG. 7, the frame ratio is set to 22.50 FPS (frames per second). After any one of the set inputs described above is effected, an OK button 604 is selected and designated and designation of the variable effect is completed. In addition, a button 408 for designating special effects other than the variable effect, such as fit-to-fill, strobe motion, freeze frames, etc, is also provided in the pop-up monitor window 202 shown in FIG. 6.

When editing is executed to designate the reproduction sequence of the cuts of the image material 1103 which are registered afresh and to which the variable effect is applied or other registered image materials, area displays corresponding to each of the cuts are arranged so that the area displays such as an area display 302 of the time line window 203 represented by oblique lines in FIG. 5 and an area display 303 represented by an oblique grid are arranged at predetermined positions, such as on the right side of the area display 302 by the mouse or keyboard operating. The edition sequence information of the image materials corresponding to these area displays arrangement are generated in this way. Editing of the moving images is carried out as the sequence information generated in this way is stored in the magnetic memory device.

According to the moving image editing method of the prior art described above, however, the image material 1103 to which the variable effect is applied and which is generated afresh is completely independent of the original image material 1101 and has no association with the latter. Therefore, relational information representing from which portion of the original image material the new image material 1103 is generated is lost.

Therefore, when editing is so made as to connect the image material portions 1102 and 1104 shown in FIG. 3 among the original image material 1101, to which the special effect applied to the portions from the time code "3" to the time code "5" in the example in FIG. 2 is not applied, and the image material 1103 to which the special effect is applied and which is registered afresh, an operator must conduct the operation of registering afresh each the image material portions 1102 and 1104 to which the special effect is not applied, as the image material.

To conduct this operation, the operator must store the time codes corresponding to the frame image of the IN point and the time code corresponding tothe frame image of the OUT point of the portions in the original image material to which the special effect must be applied (the time codes of "3" and "5" in FIG. 2). Thereafter, the operator must select and designate the leading frame image of the original image material (time code "0") and the frame image immediately before the IN point frame image (time code "2"), and the frame image string between these designated frame images are registered as the new image material 1102. Similarly, the frame image string from the fraame image immediately after the OUT point frame image (time code "6") to the last frame image of the original image material (time code "9") is registered as the new image material 1104.

Therefore, the troublesome operation of registering especially those frame image strings to which the special effect is not applied as the new image materials separately from the image material to which the special effect is applied and which are registered afresh must be carried out.

The editing operation using the special effect image will be explained more concretely. It will be assumed hereby, for example, that the motion of a tennis player is imaged and this image is edited as the image material by the conventional editing apparatus. It will be assumed further that this imaging operation covers the period in which the tennis player poses for the ball and starts swinging a racket, the ball is hit by the racket and files away and the player fully swings off the racket.

When the image based on such as image material is broadcasted in a television broadcasting program, the slow motion editing operation among the variable effect described above is applied to the images of an arbitrary period from before to after the impact of the ball in order to have the image of the instant of the impact more clearly viewed by television watchers, and the edited images are stored and registered as the new image material.

However, the image material to which the variable effect is applied in this way is not broadcasted by itself from time to time. For instance, the image material before the slow motion-processed image material of in other words, the image from posing of the tennis player to the impact, or the image material after the slow motion-processed image material, that is, the image from the impact to swing-off the racket, is broadcasted with the slow motion image.

Therefore, separately from the editing processing for applying the slow motion effect, the editor must designate the range from posing of the tennis player before the slow motion-processed image material as the new image material, must designate similarly the range after the slow motion-processed image material to swing-off of the racket as a new image material, and must register especially these designated ranges, respectively.

In the broadcasting program, the image material from posing of the tennis player for the coming ball till immediately before the slow motion image described above is broadcasted as such at the normal reproduction speed. Then, the images immediately before and after the impact, to which the slow motion effect is applied, are broadcasted in succession to the image material described above. The image materials immediately after the image in the slow motion period till swing-off of the racket are broadcasted as such at the normal reproduction speed in succession to the slow motion image. In this way, the operation from posing of the tennis player till swing-off of the racket is reproduced without the interruption of the images and at the same time, the instant of the impact is broadcasted by slow reproduction.

Another problem of the operation described above is that the operator must store the time codes corresponding to the IN point of the image material portion to which the special effect is applied and the frame image of the OUT point irrelevantly to the image editing apparatus.

A computer-aided image editing system is disclosed in a User's Guide of "News Cutter 3.0", Avid Technology, Inc., Part 2, chapters 5, 6 and 7 and Part 3, chapter 8".

SUMMARY OF THE INVENTION

The present invention provides an editing method of moving images which can applying a special effect processing to a designated area and can automatically register and area of a special effect processing and other areas as separate cuts by merely designating an area of moving image information to which the special effect processing is desired to be applied.

In the computer-aided editing method of the moving image information according to the present invention, an edition range of original moving image information is designated, the special effect processing is applied by an editing apparatus to the moving images of the designated edition range, the moving image information to which the special effect processing is applied is registered as a cut to a memory device. And the moving image information of ranges which are other than the designated range are registered as other cuts to the memory device.

The computer-aided editing apparatus for editing the moving image information according to the present invention includes a memory device for storing original moving images, editing-processed moving images and editing position relation information, as input device, an editing device for applying a special effect processing to a designated range of the original moving images read from the memory device in accordance with an image editing processing program, a control device and a display device, wherein the moving image information to which the special effect processing is applied is registered as a cut while the moving image information of the ranges other than the designated range are registered as other cuts to the memory device, and the display device displays symbols representing the editing start point and the editing end point inputted by the input device, the information associated with the special effect processing and the information associated with the length of the image of the cut.

DESCRIPTION OF THE PREFERRED EMBODIMENTS

Figure 4:
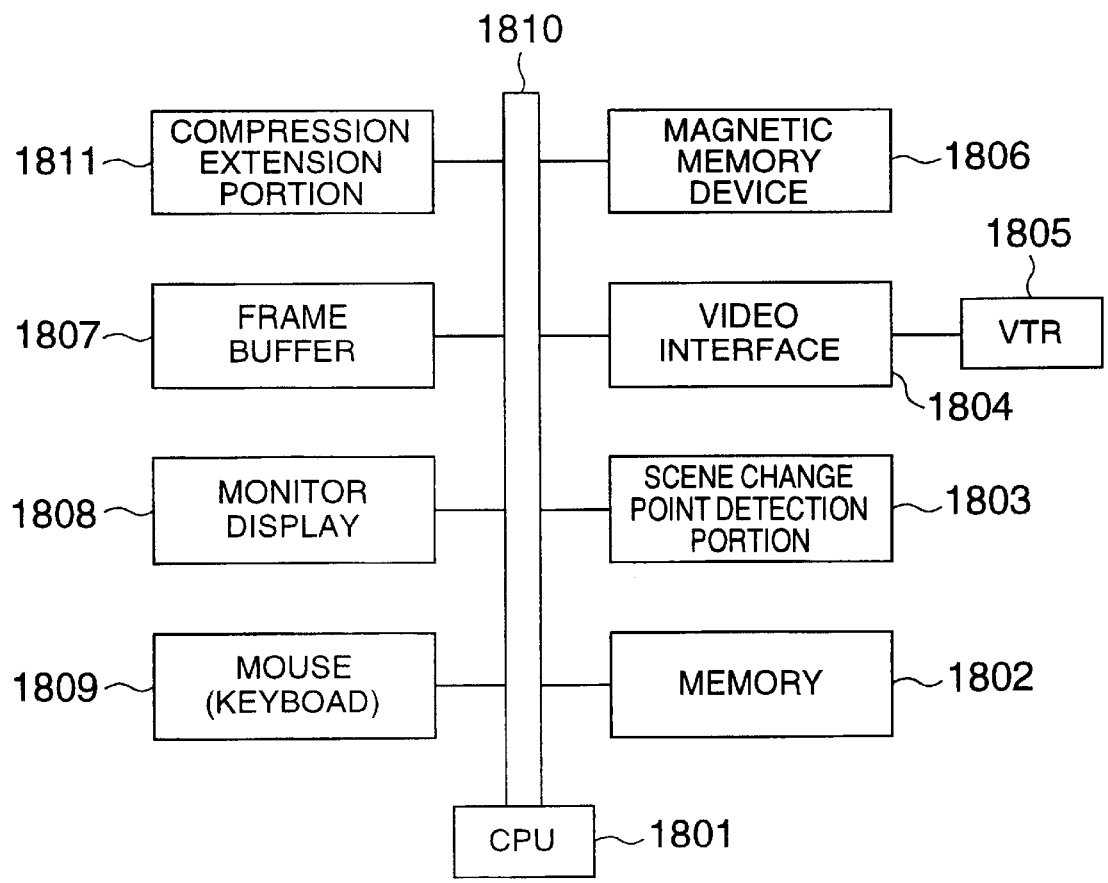
FIG. 4 is a block diagram showing a structural example of an image editing apparatus according to an embodiment of the present invention.
Figure 5:
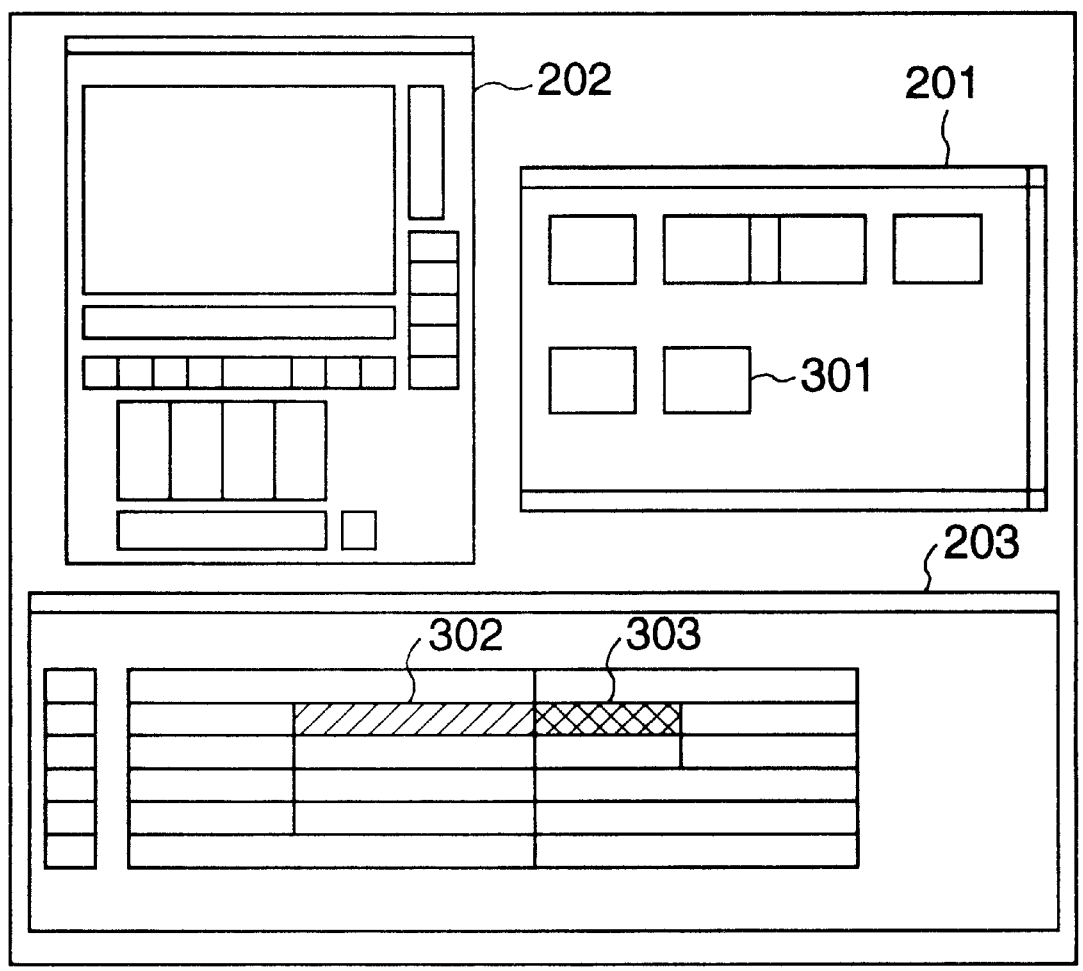
FIG. 5 is a schematic view showing an example of an operation screen display of the image editing apparatus.
Figure 6:
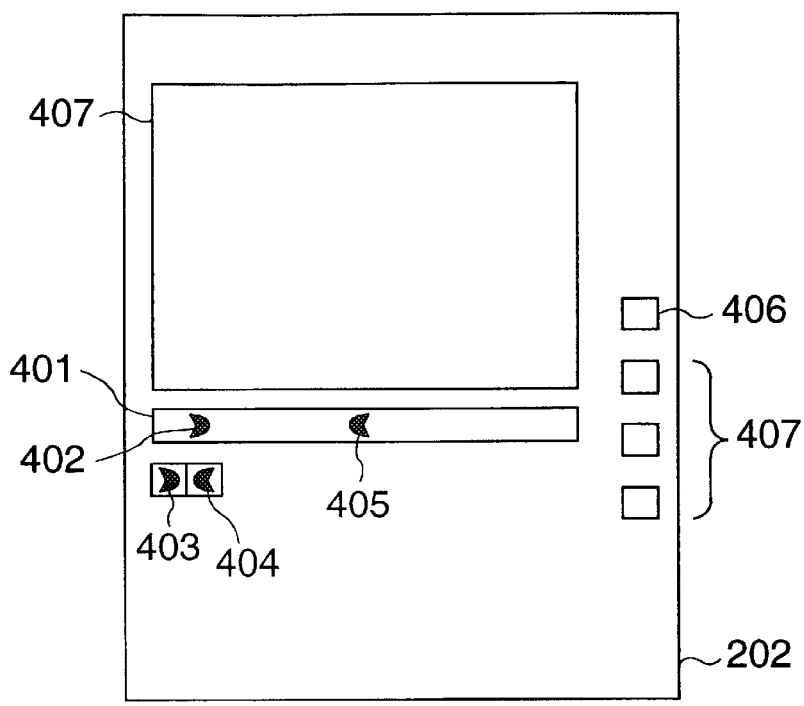
FIG. 6 is an explanatory view useful for explaining an hop-up monitor window displayed in an image editing apparatus.
Figure 7:
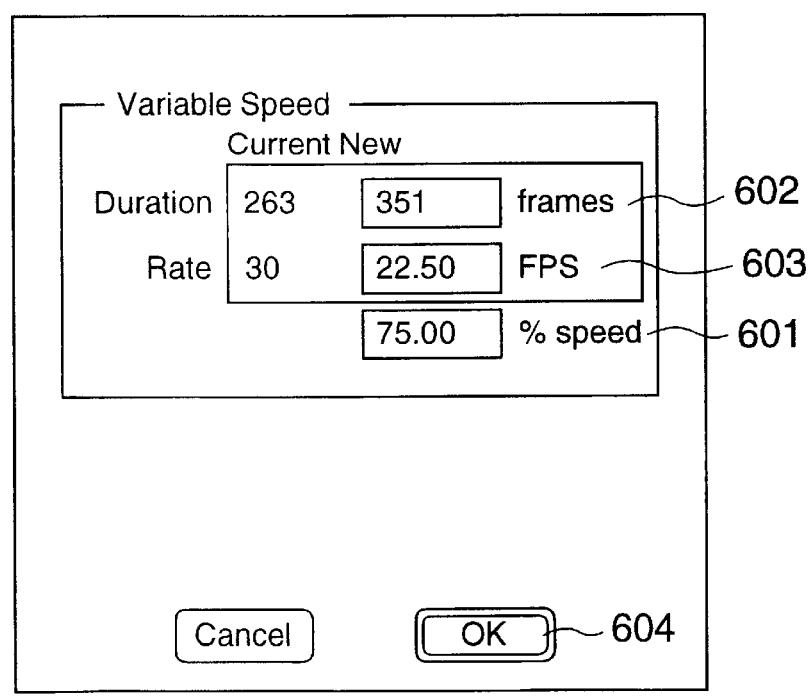
FIG. 7 is an explanatory view useful for explaining a motion effect set panel displayed in an image editing apparatus.

A block structural example of an image editing apparatus for practising an image editing method according to an embodiment of the present invention will be explained with reference to FIG. 4. This drawing shows a block structural example of the moving image editing apparatus. The moving image editing apparatus shown in the drawing includes a cup 1801 for executing various control processings, a monitor 1808 for displaying contracted moving images corresponding to cuts or scenes used for editing the moving images and for displaying a hierachical structure of the cuts and the scenes to clarify the editing state, a memory 1802 for storing various control programs for the controlling with the CPU 1801, a frame buffer 1807 for storing the contracted moving image information to be displayed on the monitor 1808, a scene change point detection portion 1803 for detecting a change point (frame image position at which the image content changes drastically) in the moving images comprising a plurality of scenes or in each scene, and a compression/extension portion 1811 for compressing or extending the image information from a VTR 1805, for example.

The image editing apparatus further includes a magnetic recording device 1806 for storing various information for each scene or each cut, such as the moving image information comprising the frame number of the change point of a series of moving images and scenes detected by the change point detection portion 1803, the contracted moving image file name and the compressed moving image file name, the contracted moving image information which is contracted in match with the data size contracted and displayed as the representative image of the data size and the cut when the entire moving image or the scene is displayed at a high speed, the compressed moving image information compressed and encoded by the compression/extension portion 1811, the hierachical number representing the number of stages of the hierarchy of each of a plurality of scenes and cuts, the cut number allocated serially in the sequence of the cuts registered to the image editing apparatus, the sequence number representing the sequence of a plurality of cuts constituting each scene, the information for identifying whether or not the contracted moving image corresponding to the scene or the cut is displayed on the monitor 1808, and so forth.

Furthermore, the image editing apparatus includes a VTR 1805 and a video interface 1804 for inputting the image signals from the VTR 1805, and a mouse or keyboard 1809 as input means for inputting the operator's instruction, and so forth.

The CPU 1801, the memory 1802, the scene change point detection portion 1803, the video interface 1804, the magnetic recording device 1806, the frame buffer 1807 and the compression/extension portion 1811 are connected to one another by a bus 1810 and are controlled by the CCPU 1801 through the bus 1810. Other recording media such as an MO (magnet-optical) disk device or a remote file device connected by a network (LAN, a network using an RS-232C interface, etc) may be used in place of the magnetic recording device 1806.

Figure 8:
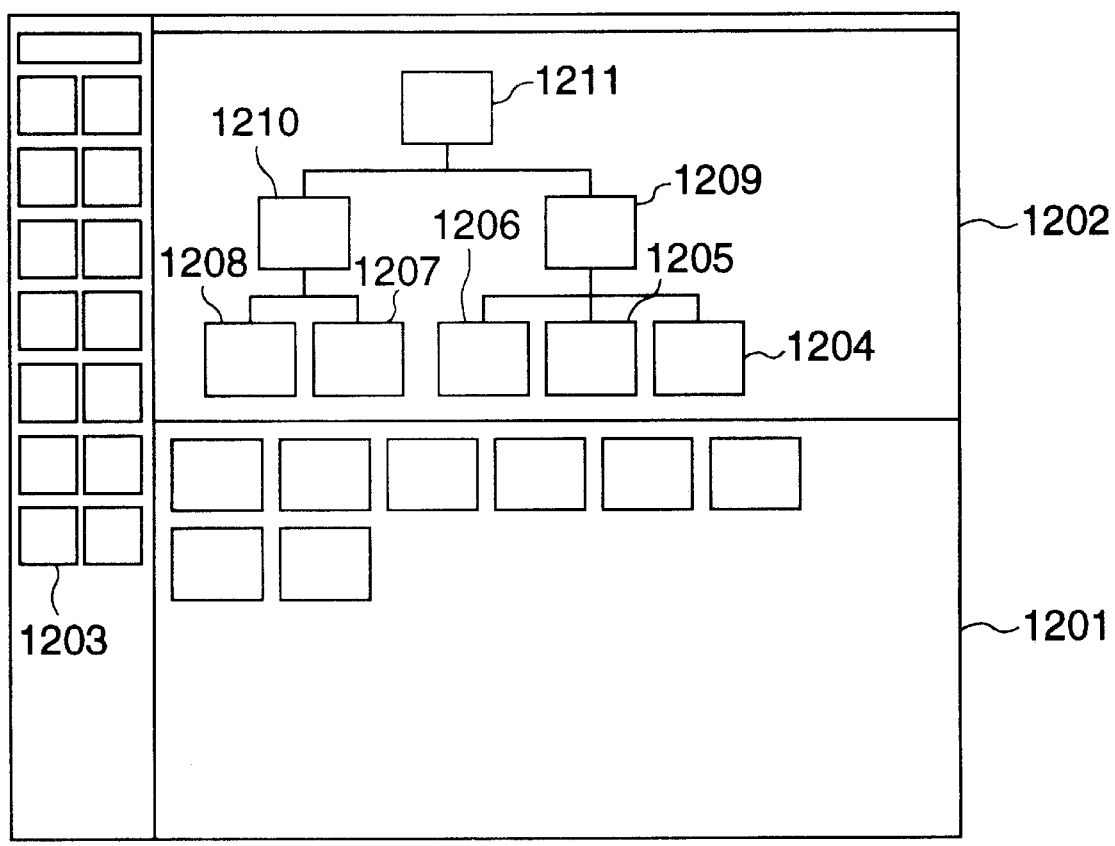
FIG. 8 is an explanatory view showing an example of an operation screen display of the image editing apparatus according to the present invention.

FIG. 8 shows an example of the operation screen display displayed on the monitor 1808 of the image editing apparatus. As shown in this drawing, a material area 1201 for tabulating and displaying the contracted images corresponding to each image material, that is, the cut, and representing the cut, an edition area 1202 for executing the moving image editing operation and a button display group comprising buttons 1203 and other buttons on the left side of these areas 1201 and 1202 are displayed.

In the edition area 1202 among them are displayed the contracted images 1204 to 1208 sotred in the frame buffer 1807 and corresponding to each cut, the contracted images 1209 and 1210 (e.g. representative images) corresponding to the scenes comprising a plurality of cuts and the contracted image 1211 (e.g. representative image) corresponding to the moving image of the edition object comprising a plurality of scenes. These contracted images 1204 to 1211 are connected by a wiring in such a manner as to represent a tree structure corresponding to each scene and the structure of the moving image, and they are displayed.

Hereinafter, the procedures for generating the cuts to which the variable effect is applied by using the present invention will be explained in such a manner as to correspond to the steps in the flowcharts shown in FIGS. 10 and 11. Each of the steps illustrated in the flow charts of FIGS. 10 and 11A and B can, for example, be implemented by one or more instructions, code, code sections and/or modules of a control (computer) program executed in CPU 1801. The computer program can, for example, be stored in a computer readable storage medium such as memory 1802 or provided by floppy disk, CD ROM, semiconductor memory, etc.

Figure 9:
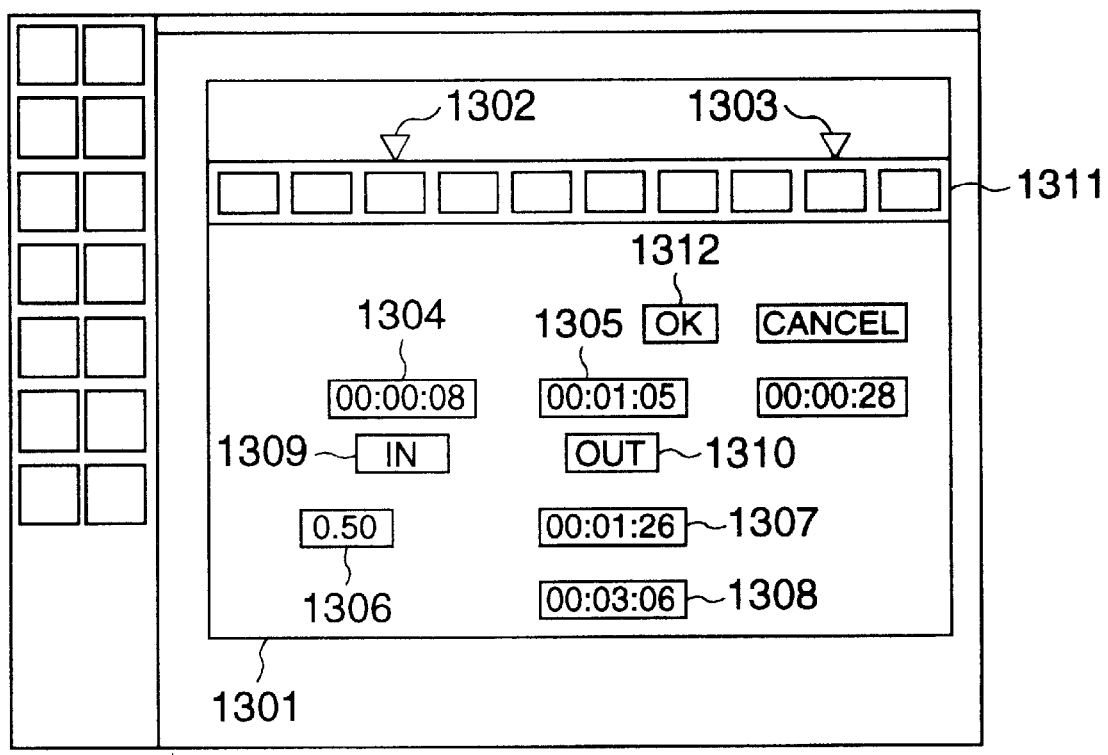
FIG. 9 is an explanatory view showing an example of a variable window displayed in the image editing apparatus according to the present invention.
Figure 10:
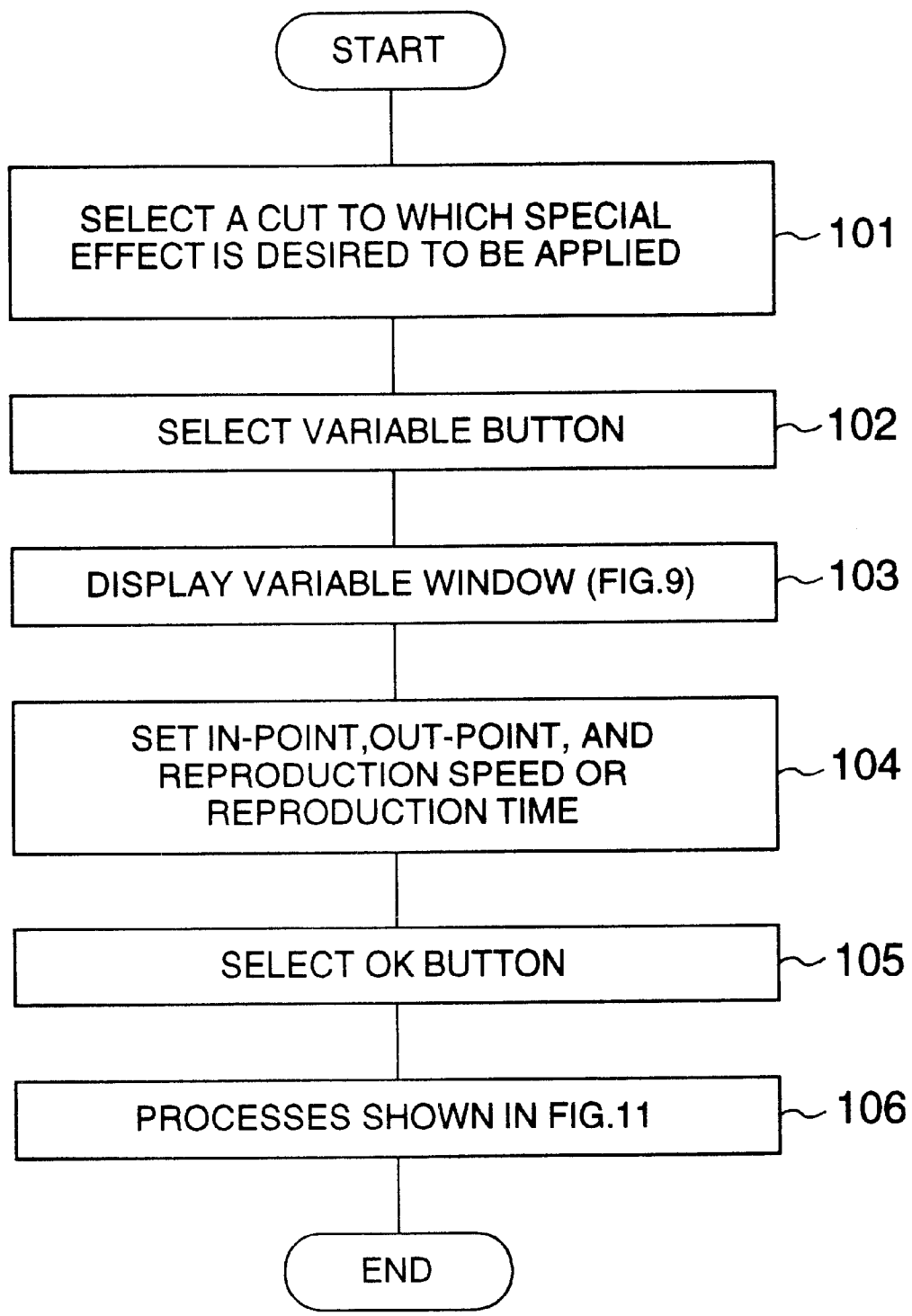
FIG. 10 is a flowchart showing an example of the procedures of a moving image editing method according to an embodiment of the present invention.

First, the contracted image representing the cut having the portion to which the variable effect is applied is selected and designated from among the contracted images displayed in the material area 1201 in FIG. 8 (step 101 in FIG. 10). Next, a variable button 1203 of the button display group is selected and designated (step 102), so that the variable window 1301 shown in FIG. 9 is displayed on the monitor 1808 (step 103).

The range to which the variable effect is to be applied is then designated by using the variable window 1301 so displayed. In other words, in the variable window 1301 shown in FIG. 9, the IN point button 1309 is first selected and designated and any one of the contracted images among those displayed in alignment in the film image string 1311 is designated. The IN point display 1302 is added to the designated contracted image and this image is set as the IN point image. This set information (time code of the IN point) is stored in the magnetic recording device 1806). Next, after the OUT point button 1310 is selected and designated, any one of the contracted images among those aligned in the film image string 1311 which is later than the contracted image to which the IN point display 1302 is put is designated. The OUT point display 1303 is added in this way to the designated contracted image. This designated image is set as the OUT point image, and the set information (time code of the OUT point) is stored in the magnetic recording device 1806. As described above, the image material portion between the frame images (between the IN point image and OUT point image) corresponding to the contracted display selected on the film frame image string 1311 is designated as the range to which the variable effect is applied.

According to another method, the time code of the frame image to be set as the IN point image is inputted by the mouse or the keyboard to the IN point set dialog box 1304 and the time code of the frame image to be set as the OUT point image is inputted to the OUT point set dialog box 1305. In consequence, the image material portions between the frame images corresponding to these inputted time codes are designated as the range to which the variable effect is applied.

After the range of the variable effect is designated by either of these methods, the reproduction speed of the designated portions is set. In other words, the proportion of the set reproduction speed to the normal speed is inputted to 0.50, for example, by the reproduction speed set dialog box 1306 by the mouse or the keyboard 1809 and the reproduction speed is set. The reproduction time of generated image material portions applied with the effect to be set to the reproduction time set dialog box 1307 after the variable effect such as 00:01:26 is inputted by the mouse or the keyboard 1809. Alternatively, the total reproduction time of the generated image material portions and the portions outside the designated portions in the cut to be set to the total reproduction time set dialog box 1308 after the variable effect such as 00:00:03:06 is inputted.

The reproduction speed is set by any one of the inputs described above (step 104) and the OK button 1312 of the variable window is selected (step 105), and the cut according to the present invention are dividedly generated (step 106). In other words, the variable effect is imparted to the image material portion within the selection range (between the frames of the time codes "3" and "5") as shown in FIG. 1 (step 1905 in FIG. 11) and the cuts of the image material 1103 applied with the variable effect are generated and registered afresh to the image editing apparatus (steps 1907 and 1908j).

Figures 11, 11A:
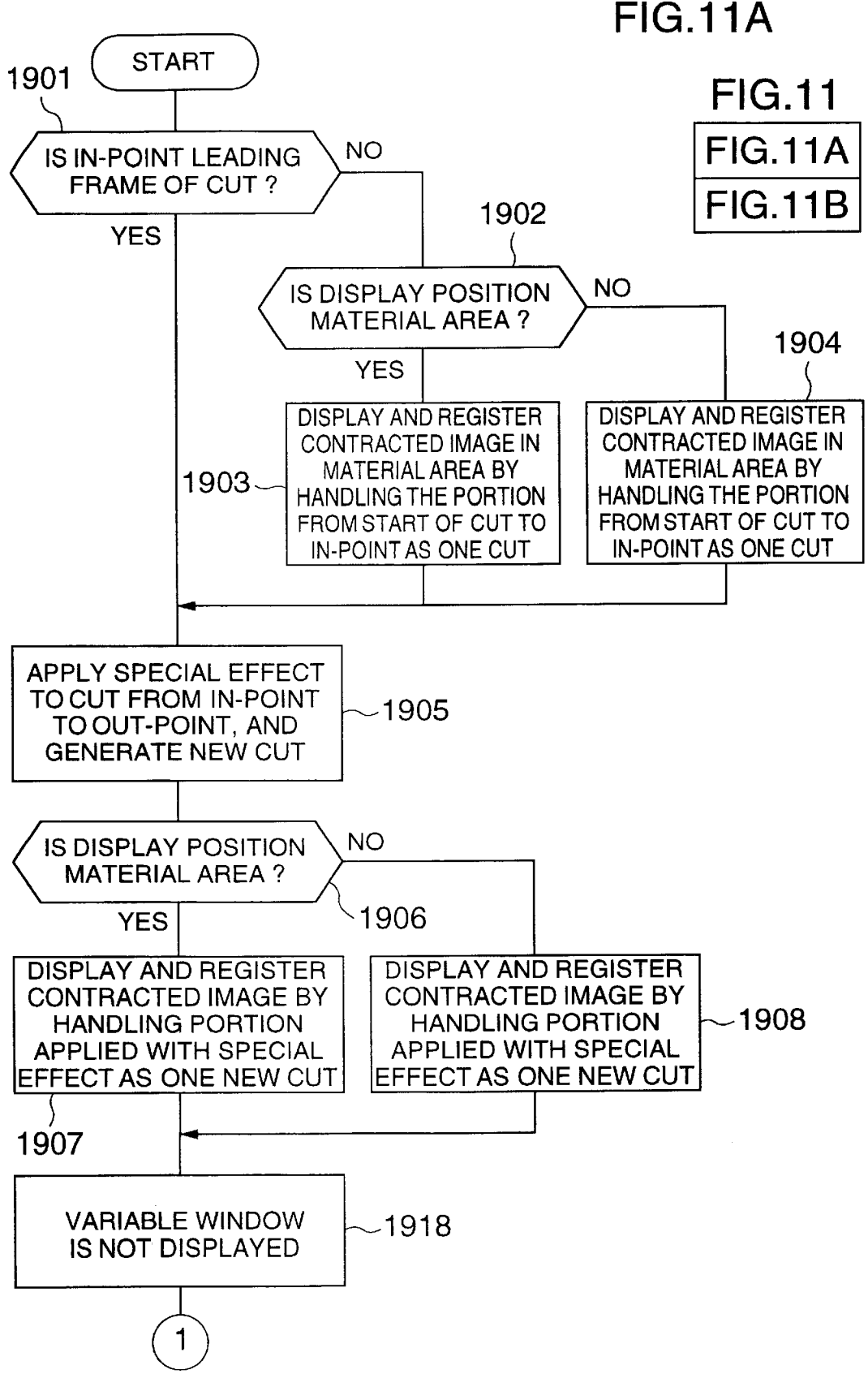
FIGS. 11A and B is a flowchart showing an example of the procedure of a moving image editing method according to an embodiment of the present invention.
Figure 11B:
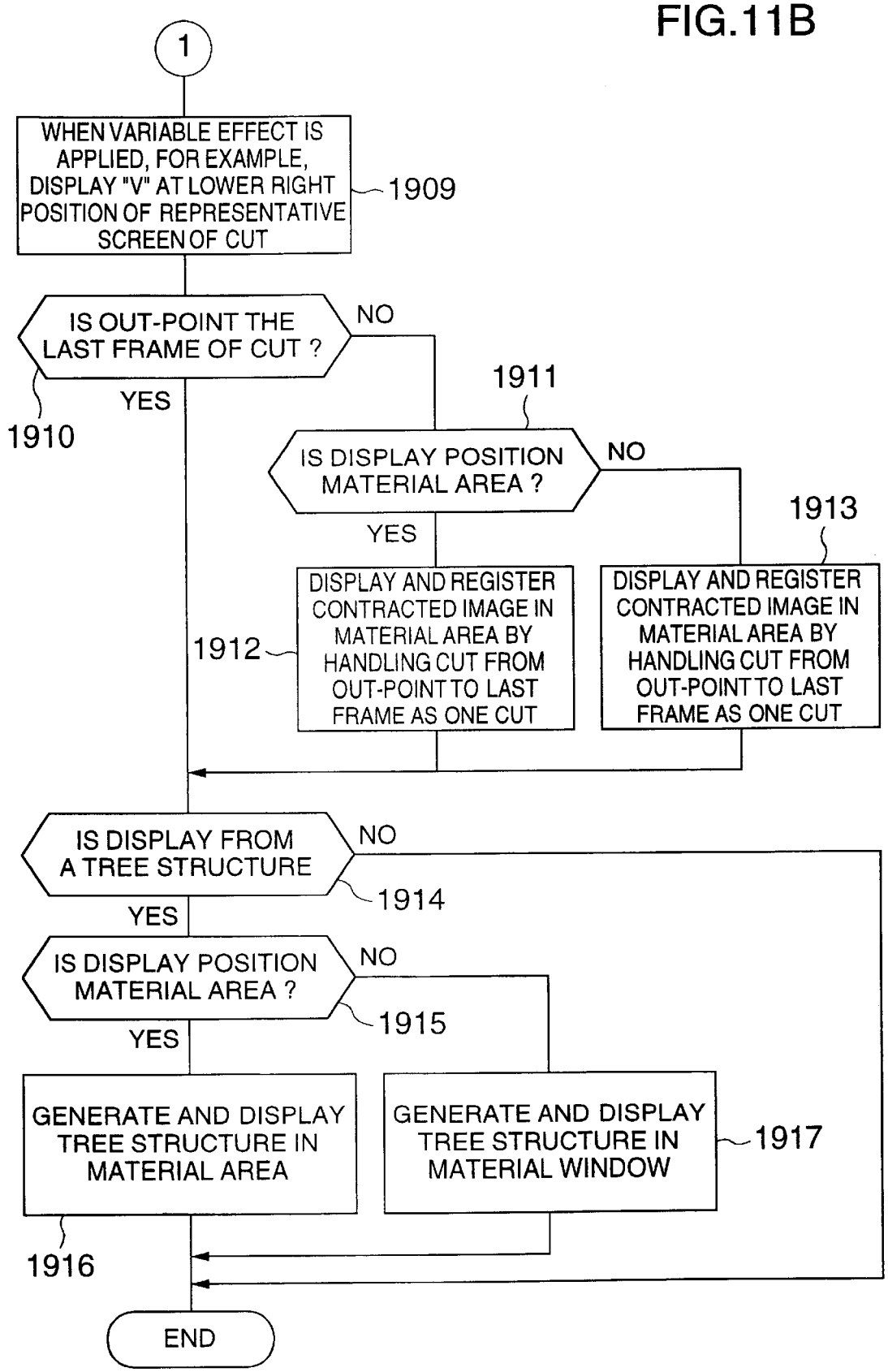

After the operation described above, the variable window 1301 shown in FIG. 9 changes to non-display and returns to the screen shown in FIG. 8 (step 1918 in FIG. 11).

Figure 1:
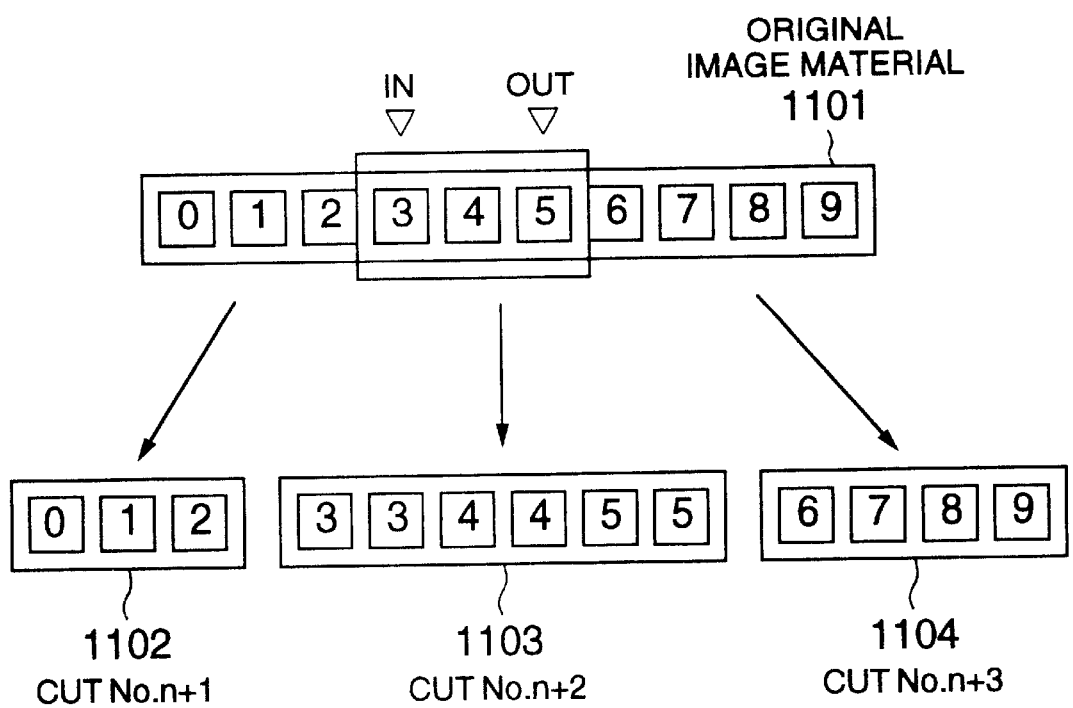
FIG. 1 is a film frame image diagram useful for explaining the process in which an original cut image is divided into new cut images in a moving image editing method according to an embodiment of the present invention.
Figure 2:
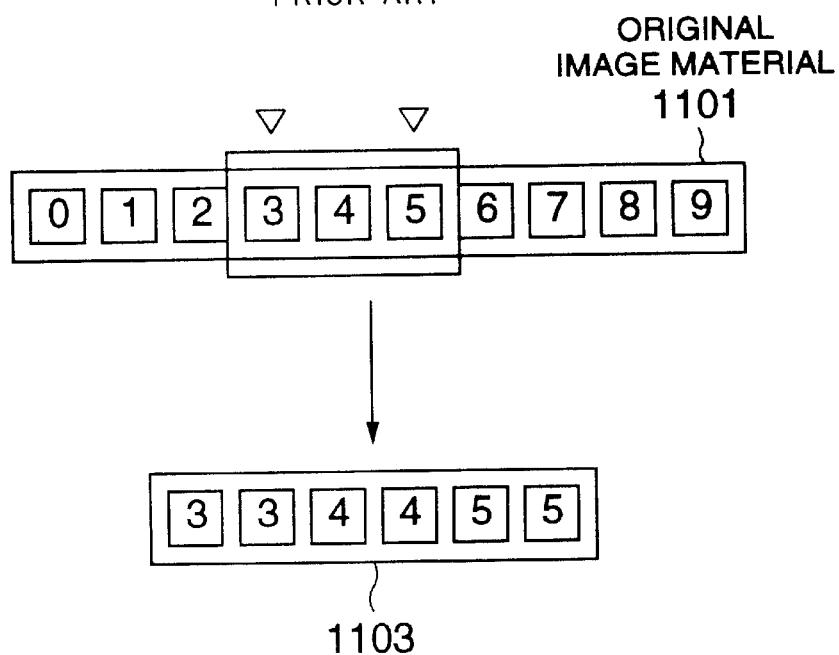
FIG. 2 is a film frame image diagram useful for explaining the process in which a special effect processing is applied to a part of an original cut image in a moving image editing method according to a prior art method.
Figure 3:
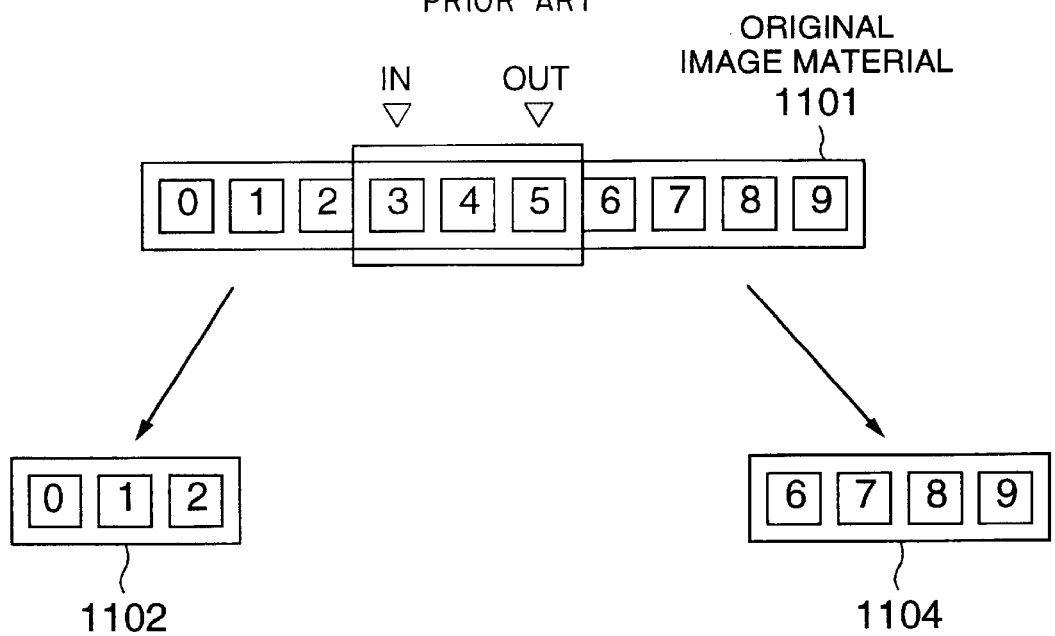
FIG. 3 is a film image diagram useful for explaining the process in which a part of an original cut image is divided into new cut images in a moving image editing method according to a prior art method.

FIG. 1 shows the cut image 1101 of the original and the new cut 1103 generated by applying the variable effect processing described above to the frame portions 3, 4 and 5 inside the cut image 1101.

In the present invention, the portions to which the variable effect is not applied are generated and registered automatically as the new cuts 1102 and 1104 to the image editing apparatus simultaneously with the registration of the cuts of the image material 1103 applied with the variable effect described above. A contracted image representative of each cut 1102, 1103, 1104 is displayed (step 106 shown in FIG. 10), too. Hereinafter, this operation will be explained in contrast with each step shown in FIG. 11. FIG. 11 is a flowchart of the variable effect editing processing according to the embodiment of the present invention and represents in detail the step 106. A program for executing the processing represented by this flowchart is stored in the memory 1802. This memory 1802 is a storage medium such as a semiconductor memory, a magnetic disk, an optical disk, or other types of memory for storing computer programs.

First, whether or not the set IN point image described above is the leading frame image (frame number "0" in FIG. 1) inside the cut is judged (step 1901 in FIG. 11). When the IN point image is made to be the leading frame image of the original cut, the cut 1102 is not generated. Alternatively, when the IN point image is not the leading frame image of the original cut, three frame image portions of the original image material 1101 having the time codes "0" to "2" in the example shown in FIG. 1 are registered as the new cut, that is, as the image material 1102, to the memory device 1806 and are displayed by the monitor 1808 (steps 1903 and 1904).

Next, whether or not the OUT point image so set is the last frame image (frame number "9" in FIG. 1) is judged (step 1910). When the OUT point image is made to be the last frame image of the original cut 1101, the cut 1104 is not generated. Alternatively, when the IN point image is not made to be the last frame image of the original cut, four image portions of the original image material 1101 having the time codes "6" to "9" in the example shown in FIG. 1 are registered as the new cut, that is, as the image material 1104, to the memory device 1806 and are displayed by the monitor 1808 (steps 1912 and 1913).

The sequence information (according to the time code) is allocated to the cuts 1102, 1103 and 1104 that are generated and registered afresh as explained above in accordance with the time sequence in the original cut 1101 and is stored in the magnetic memory device 1806. When the contracted moving images corresponding to the three cuts generated afresh are displayed, they are aligned in the sequence information so added and are displayed in the tree structure, for example, in the material area 1201 or in the material window 1401 (steps 1916 and 1917).

The information of the cut 1103 obtained by setting the special effect such as the variable effect to the predetermined image information portions (frames 3 to 5) of the original cut 1101 is generated and registered afresh in the manner described above and at the same time, the information as the new cuts 1102 and 1104 is generated and registered also for the image information portions (frames 0 to 2 and 6 to 9) of the original cut 1101 not applied with the variable effect. Therefore, the necessity for generating and registering the cut by designating the new IN and OUT points before editing can be reduced and the operation factor can be improved. Further, because the contracted moving images corresponding to the cuts registered afresh are aligned and displayed in the sequence of the image information portions as the original, it becomes by far easier to combine and select these cuts when the cuts of the image information portions of the original cut, to which the variable effect is applied, and those not applied with the variable effect are desired to be aligned and edited since these cuts are adjacent to one another and are aligned and displayed in accordance with the sequence of the original cut.

Conventionally, when a plurality of program materials comprising frame image strings (also called "cuts") having a plurality of consecutive frame images are registered and saved in an image editing apparatus, the cut number is allocated to each program material such as "1" to "n" (where n is a positive integer).

Here, when appropriate two frame images in a certain program material are designated as the IN point and the OUT point, respectively, a part of the image material or in other words, the range from the IN point frame image to the OUT point frame image, is selected and it is assumed that a special effect processing is applied to this selected range. Then, the image information obtained as the result of the processing such as the image information (frame image string) obtained as the result of the variable speed processing as one of the special effects are registered and saved as the new image material in the image editing system and at the same time, a cut number "n+1" is allocated to this image material.

Therefore, in this prior art example, the image material that is registered afresh is only one image material having the cut number "n+1". In other words, one new image material is registered by one special effect processing operation.

According to the present invention, on the other hand, the range for the special effect processing is designated by the IN point and the OUT point for the frame images constituting the image material as the object of the special effect processing (original image material), the new image material obtained by this processing (special effect-processed image material) is registered, the frame image string, to which the special effect processing is not applied among the frame images constituting the original image material is detected, and the frame image string so detected is registered as the new image material (non-processed image material). At this time, the cut numbers in accordance with the sequence of the original image material of the original frame image string are allocated to the special effect-processed image material and to the non-processed image material, respectively.

This operation will be explained with reference to FIG. 1, for example. The original image material 1101 as one of a image materials (which are assumed to have the cut numbers "1" to "n") which are registered already is handled as the object of editing.

First, the frame image having the frame number "3" (hereinafter called the "frame image "3"; this also holds true of other frame images) among the frame images constituting the original image material 1101 is designated as the IN point and the frame image "5", as the OUT point. The special effect processing such as the slow effect processing in the example of FIG. 1 among the variable speed effect processing is applied to image information within the range of the frame images "3" to "5" so designated. In this way, the image material 1103 applied with the special effect processing is generated and registered.

In this example, further, the image material 1102 comprising the frame image string (frame images "0" to "2") ahead of the IN point frame image "3" in the frame sequence in the original image material 1101 is registered afresh. Similarly, the image material 1104 comprising the frame image string (frame images "6" and "9") behind the OUT point frame image "5" in the frame sequence in the original image material 1101 is registered afresh.

A this time, the frame images "0" to "2", the frame images "3" to "5" and the frame images "6" to "9" are the original frame image strings for the three image materials 1102, 1103 and 1104 that are registered afresh, respectively. Therefore, the sequence of these three frame image strings is such that the frame images "0" to "2" are the foremost or the first frame image string, the frame images "3" to "5" are the second frame image string and the frame images "6" to "9" are the last, that is, the third frame image string.

Because of such a sequence, the present invention allocates the cut number "n+1" to the image material 1102 as the no non-processed image material, the cut number "n+2" to the image material 1103 as the special effect processed image material and the cut number "n+3" to the image material 1104 as the non-processed image material, for example. Further, the image materials having the cut numbers "n+1", "n+2" and "n+3" is allocated are managed as a pack.

Because the cut numbers "n+1", "n+2" and "n +3" are the consecutive numbers, a plurality of image materials, which will make it easy to execute effectively the editing processing to be made in the post-processing, can be registered extremely easily while keeping the time sequence as the image contents of the three image materials generated afresh in this sequence both before and after the special effect processing.

Incidentally, when the images of the new cuts 1102, 1103 and 1104 having the new cut numbers allocated thereto are stored in the form of the image data to the memory device 1806, a large memory capacity is required for the memory device 1806, but this memory capacity can be reduced to minimum by registering only the editing information designating the time codes of the images or the kind of the special processings in association with the new cut number to the memory device 1806 without generating afresh the image data itself of the new cuts 1102, 1103 and 1104.

The following four methods are available as the method of displaying the contracted moving images corresponding to the cuts newly generated and registered in the present invention.

Figure 12:
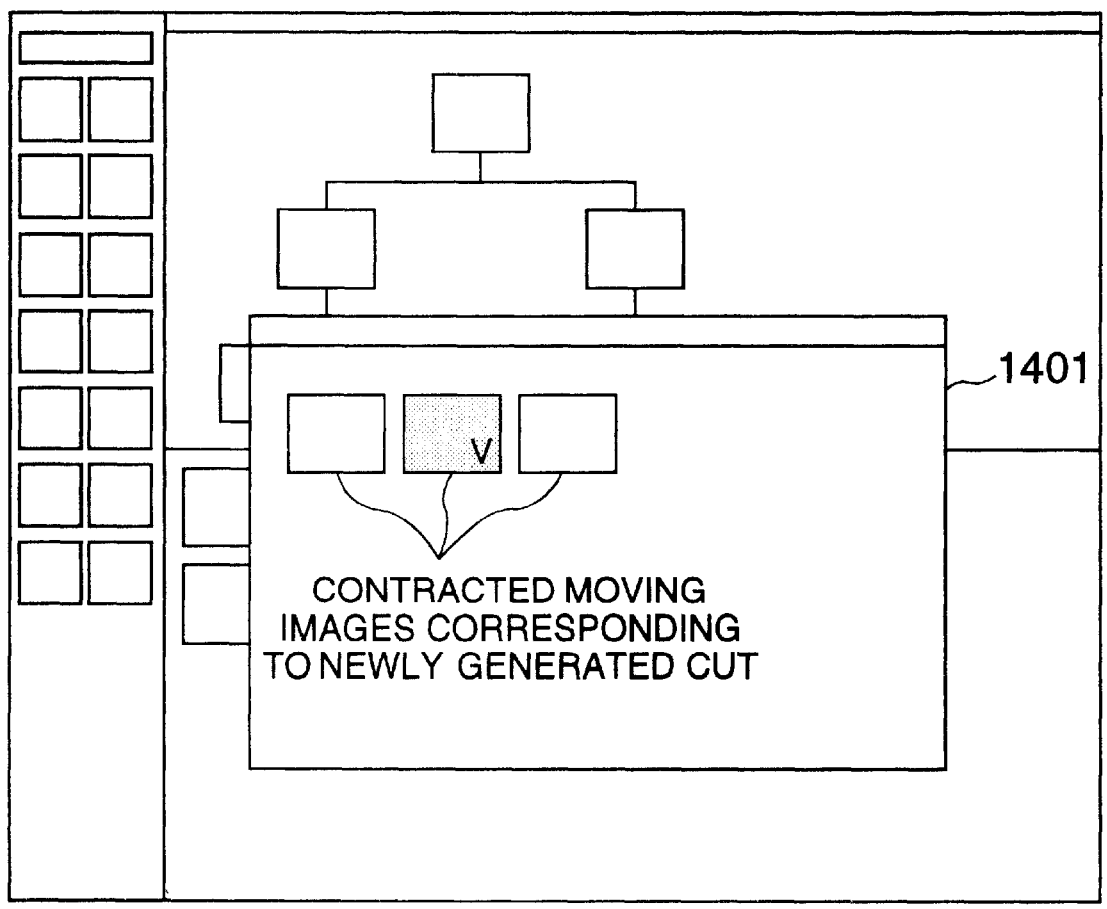
FIG. 12 is an explanatory view showing an example of a contracted image display according to the present invention.

Display method 1 (steps 1904→1908→1913):

As shown in FIG. 12 depicting a display example of the contracted moving image, the contracted image corresponding to the three cuts newly generated are displayed in alignment in the material window 1401 in this and following examples. When these images are desired to be used for editing, they are selected and registered to the material area.

In this instance, a character "V" corresponding to the special effect is displayed in the contracted image corresponding to the cut to which the variable effect, for example, is applied as the special effect. Because this character display is displayed in the contracted image, it is possible to recognize at a glance to which cut or cuts the special effect is applied. Incidentally, this character display is similarly employed in the following display methods, too.

Figure 13:
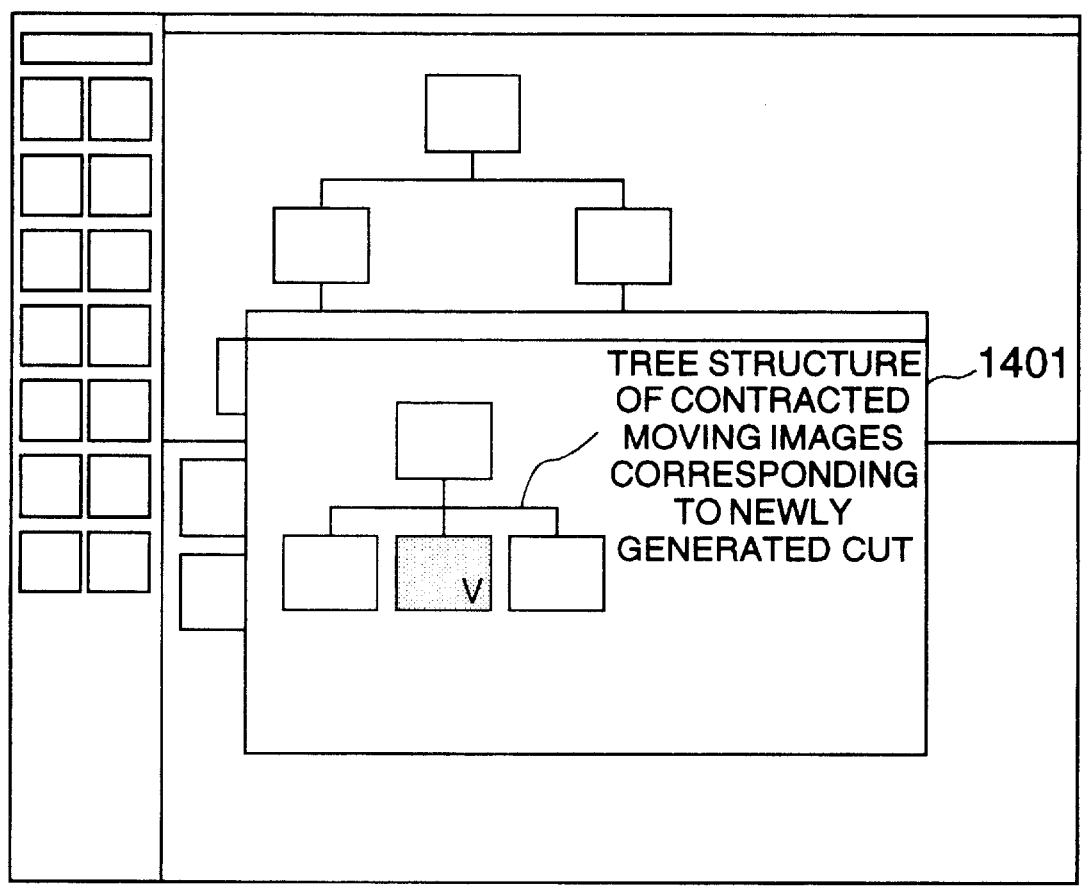
FIG. 13 is an explanatory view showing another example of the contracted image display according to the present invention.

Display method 2 (steps 1904→1908→1913→1917):

As shown in FIG. 13 depicting a display example of the contracted moving image, the contracted moving images corresponding to the newly generated cuts are displayed as one tree structure comprising the three elements in the material window 1401 which is displayed afresh.

Figure 14:
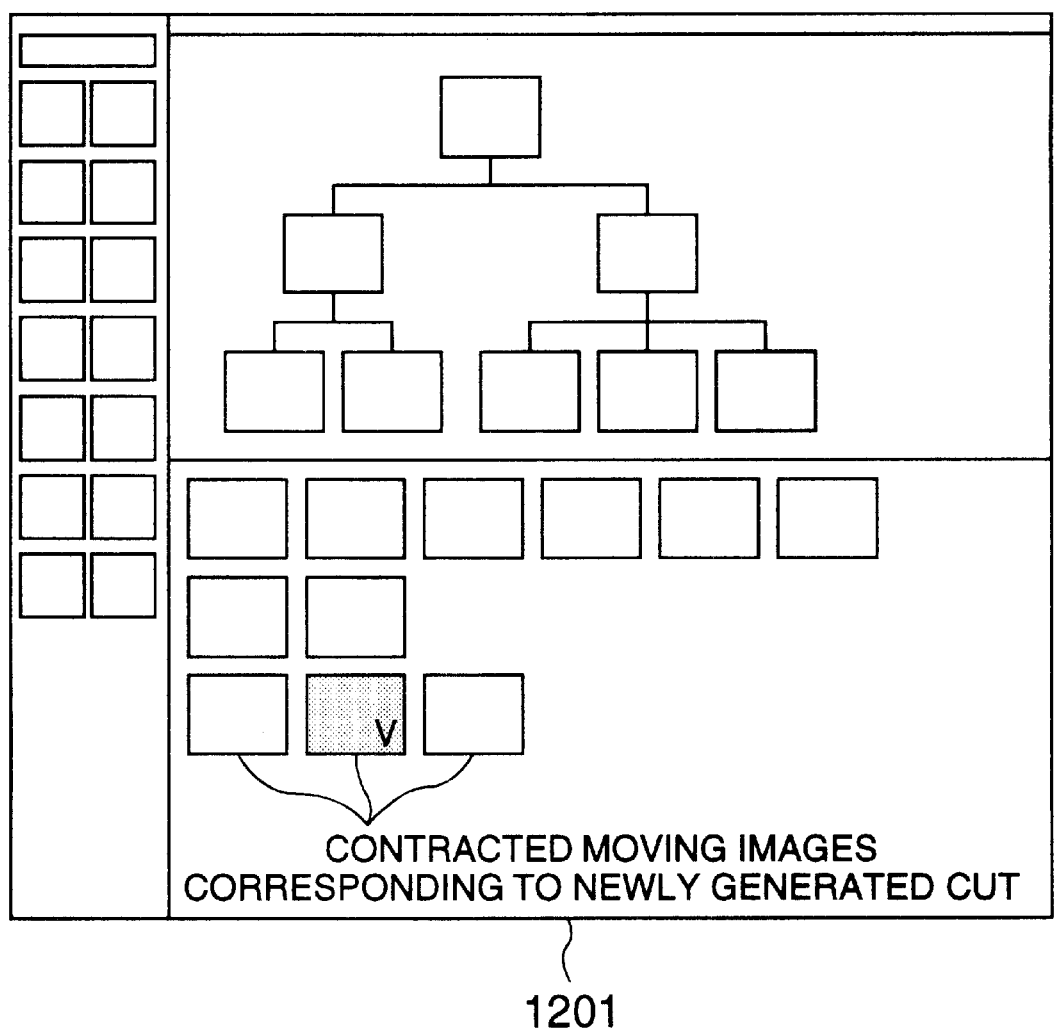
FIG. 14 is an explanatory view showing still another example of the contracted image display according to the present invention.

Display method 3 (steps 1903→1907→1912):

As shown in FIG. 14 depicting the display example of the contracted moving images, three contracted moving images corresponding to the newly generated cuts are displayed in alignment in the material area 1201.

Display method 4 (steps 1903→1907→1912→1916)

Figure 15:
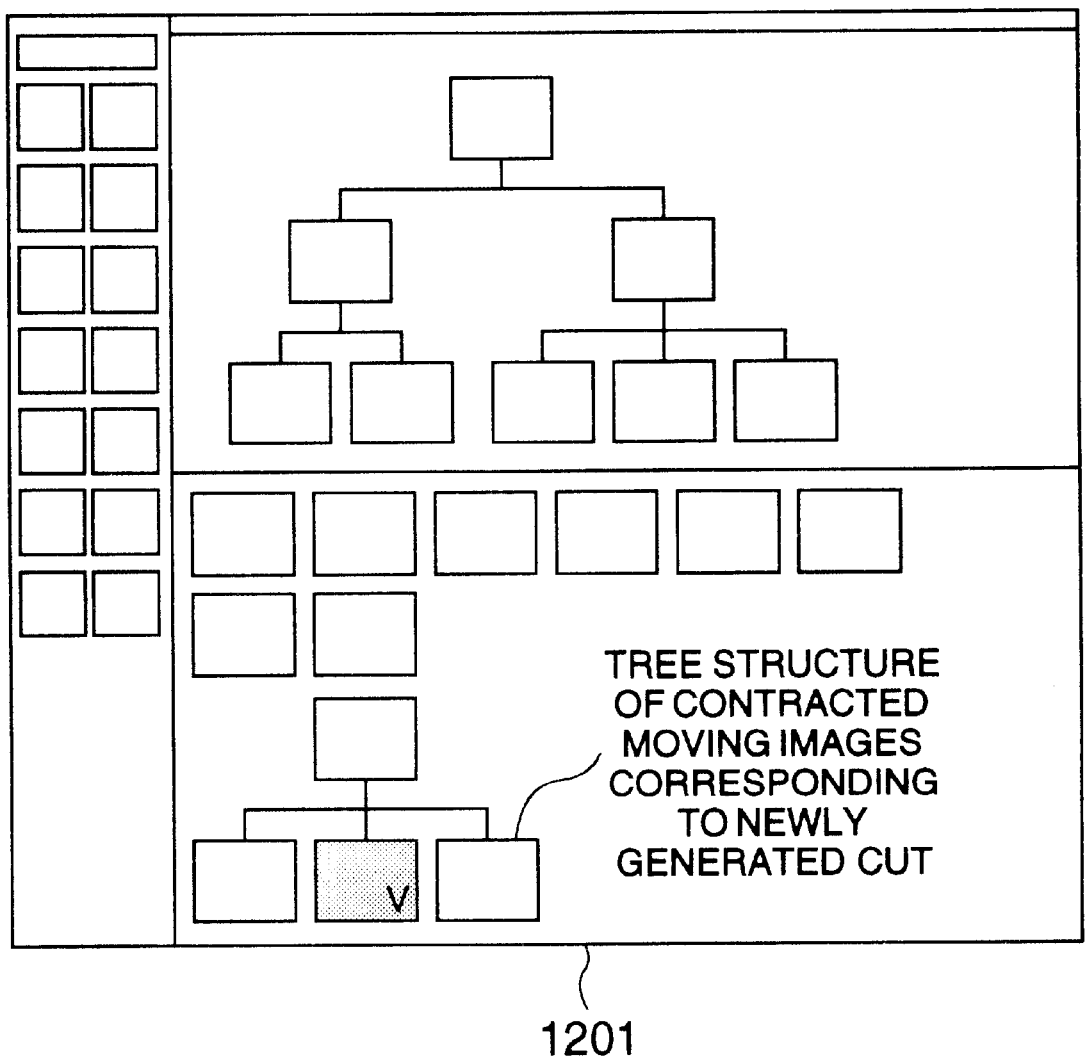
FIG. 15 is an explanatory view showing still another example of the contracted image display according to the present invention.

As shown in FIG. 15 depicting the display example of the contracted moving images, the contracted moving images corresponding to the newly generated cuts are displayed as one tree structure comprising the three elements in the material area 1201.

The explanation given above deals with the case where the special effect is applied to the intermediate portion of the cuts and the three cuts are generated, by way of example. When the special effect is applied to the former half or latter half portion of the cuts, the cut of the portion applied with the special effect and the remaining portion, that is, two portions, are generated afresh. When the special effect is applied to the entire cut, only the cut applied with the special effect is generated afresh.

Though the above explains the variable effect among the special effects, the aforementioned problems can be solved for other special effects by similarly employing the similar display form.

When the special effect is applied to the image material, the present invention generates simultaneously the image material obtained by applying the special effect and the image material portion of the original image material not applied with the special effect as the new image material, and can therefore generate efficiently the image materials used for the subsequent editing work. Further, the contracted moving image display corresponding to the new image material comprising the image material obtained by applying the special effect and the image material portion of the original image material not applied with the special effect is displayed on the display monitor of the moving image editing apparatus in association with one another such as in the sequence of the original image materials. Therefore, the combination of these image materials can be easily indicated when the editing work is conducted by combining and editing them.

What is claimed is:

1. An editing method of editing moving image information comprising the steps of:

detecting scene change points of said moving image information;

dividing said moving image information into a plurality of cuts between said scene change points, each cut including a plurality of frame images;

storing a plurality of said cuts in a memory device;

displaying sequentially contracted representative images corresponding to said cuts on a display device;

designating a range of said moving image information corresponding to a contracted representative image in order to apply a predetermined effect processing desired by an operator to said designated range of said moving image information corresponding to said contracted representative image;

storing at substantially the same time a first group of frame images corresponding to said designated range and a second group of frame images adjacent to said first group but outside said designated range; and applying said predetermined effect processing to said first group.

2. An editing method according to claim 1, further comprising the step of:

displaying said first and second groups on said display device, said first group having been applied said predetermined effect processing.

3. An editing method according to claim 1, wherein said designating step comprises a step of:

setting an IN point representing an editing start point of said moving image information and an OUT point representing an editing end point thereof.

4. An editing method according to claim 3, wherein cut numbers are allocated to said cuts in the sequence of said frame images and said cuts with said cut numbers are registered to said memory device.

5. An editing method according to claim 1, wherein, when said predetermined effect processing is a mode for reproducing the moving image at a different speed from a standard reproduction speed, the information of said different speed is displayed on said display device.

6. An editing method according to claim 1, wherein, when said predetermined effect processing is applied to a cut, a symbol representing said predetermined effect processing is displayed with a contracted representative image.

7. An editing method according to claim 1, wherein said contracted representative images are displayed in a hierarchical structure.

8. An editing apparatus for editing moving image information comprising:

a detector which detects scene change points of said moving image information;

means for dividing said moving image information into a plurality of cuts between said scene change points, each cut including a plurality of frame images;

a memory device which stores a plurality of said cuts;

a display device which displays sequentially contracted representative images corresponding to said cuts;

designating means for designating a range of said moving image information corresponding to a contracted representative image in order to apply a predetermined effect processing desired by an operator to said designated range of said moving image information corresponding to said contracted representative image, wherein said memory device stores at substantially the time a first group of frame images corresponding to said designated range and a second group of frame images adjacent to said first group but outside said designed range; and a controller which applies said predetermined effect processing to said first group and controls said detector, said dividing means, said memory device, said display device, and said designating means.

9. An editing apparatus according to claim 8, wherein said controller controls said display device so as to display said first and second groups, wherein said predetermined effect processing has being applied to said first group.

10. An editing apparatus according to claim 8, wherein said designating means sets an IN point representing an editing start point of said moving image information and an OUT point representing an editing IN point thereof.

11. An editing apparatus according to claim 10, wherein cut numbers are allocated to said cuts in the sequence of said frame numbers and said cuts with said cut numbers are registered in said memory device.

12. An editing apparatus according to claim 8, wherein, when said predetermined effect processing is a mode for reproducing the moving image at a different speed from a standard reproduction speed, said controller controls said display device so that said information of different display speed is displayed on said display device.

13. An editing apparatus according to claim 8, wherein, when said predetermined effect processing is applied to a cut, said controller controls said display device so that a symbol representing said predetermined effect processing is displayed with a contracted representative image.

14. An editing apparatus according to claim 8, wherein said contracted represented images are displayed in a hierarchical structure.

* * * * *